US010911573B2

(12) United States Patent
Arakeri et al.

(10) Patent No.: US 10,911,573 B2
(45) Date of Patent: Feb. 2, 2021

(54) WEB-BASED COLLABORATIVE INKING VIA COMPUTER NETWORKS

(71) Applicant: Microsoft Technology Licensing, LLC, Redmond, WA (US)

(72) Inventors: Rahul Arakeri, Bothell, WA (US); Clark L. Masterson, Sammamish, WA (US); Matthew Allen Rakow, Seattle, WA (US); Rossen Atanassov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/234,785

(22) Filed: Dec. 28, 2018

(65) Prior Publication Data

US 2020/0213421 A1 Jul. 2, 2020

(51) Int. Cl.
*H04L 29/08* (2006.01)
*H04L 29/06* (2006.01)
*G06F 3/0488* (2013.01)

(52) U.S. Cl.
CPC .......... *H04L 67/36* (2013.01); *H04L 65/1069* (2013.01); *H04L 65/1089* (2013.01);
(Continued)

(58) Field of Classification Search
CPC ..... H04L 67/36; H04L 67/025; H04L 67/104; H04L 65/1069; H04L 65/1089; H04F 3/04883
(Continued)

(56) References Cited

U.S. PATENT DOCUMENTS 6,342,906 B1 * 1/2002 Kumar .................... G06F 3/038
709/201
8,751,689 B2 6/2014 Atamel
(Continued)

FOREIGN PATENT DOCUMENTS

WO 2007062187 A2 5/2007
WO 2015075930 A1 5/2015

OTHER PUBLICATIONS

Jaclyn Kostner, How to leverage whiteboards and annotations in WebEx, May 14, 2012, YouTube, https://www.youtube.com/watch?v=hIS553HN7rk (Year: 2012).*
(Continued)

*Primary Examiner* — Zi Ye
(74) *Attorney, Agent, or Firm* — Liang IP, PLLC (57) ABSTRACT

Techniques for web-based collaborative inking sessions via a computer network are described in this document. In one embodiment, a first computer can serialize detected pointer input at a first computer into data representing one or more ink objects individually representing an image or animation corresponding to the detected pointer input. The first computer can then transmit the data representing the serialized ink objects to the second computer via the computer network. Upon receiving the transmitted data, the second computer can de-serialize the received serialized ink objects, reconstruct the image or animation corresponding to the detected pointer input at the first computer, and surface, to a second user, the image or animation of the detected pointer input on a second web browser surfacing the same webpage on the second computer, thereby enabling a web-based collaboration session between the first and second users.

20 Claims, 9 Drawing Sheets

(52) U.S. Cl.
CPC .......... *H04L 67/025* (2013.01); *H04L 67/104* (2013.01); *G06F 3/04883* (2013.01)

(58) Field of Classification Search
USPC ......................................................... 709/228
See application file for complete search history.

(56) References Cited

U.S. PATENT DOCUMENTS

| | | | | |
|---|---|---|---|---|
| 8,930,462 | B1* | 1/2015 | Banerjee | G06Q 10/101 |
| | | | | 709/205 |
| 2016/0352803 | A1* | 12/2016 | Amiga | H04L 67/28 |
| 2018/0052940 | A1 | 2/2018 | Miller et al. | |

OTHER PUBLICATIONS

Justin Johns, How to Auto Accept All Requests in WebEx, Jan. 23, 2015, accessdata.com, https://support.accessdata.com/hc/en-us/articles/204092365-How-to-Auto-Accept-All-Requests-in-WebEx (Year: 2015).*

Cisco, Why Web Ex?, 2009, www.cisco.com, https://www.cisco.com/c/dam/en_us/solutions/industries/docs/gov/wp_whywebex_1009.pdf (Year: 2009).*

Hu, et al., "A Streaming Digital Ink Framework for Multi-Party Collaboration", In Proceedings of International Conference on Intelligent Computer Mathematics, Jul. 8, 2012, pp. 81-95.

"International Search Report and Written Opinion issued in PCT Application No. PCT/US2019/067709", dated Apr. 17, 2020, 13 Pages.

* cited by examiner

WEB-BASED COLLABORATIVE INKING VIA COMPUTER NETWORKS

BACKGROUND

Modern computing devices, such as desktops, smartphones, tablets, and laptops can often include a touchscreen as an input/output component. A user can interact with such computing devices via the touchscreen with a stylus, a pen, a mouse, a touchpad, or even the user's finger. For example, a user can use a stylus or finger to navigate through menus, paint pictures, write notes, sign documents, or perform other suitable operations via the touchscreen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In computing, pen computing generally refers to a user-interface using a pen, a stylus, a user's finger, a mouse, or a touchpad as a pointer input device for providing digital ink (referred to herein a "ink" for brevity) or other suitable types of pointer input to a computer. In certain computing devices, pen computing applications employing such a user-interface can allow users to use a stylus, a pen, a finger, a mouse, or a touchpad to handwrite comments, remarks, editing marks, or other annotations to books or documents displayed on a touchscreen or other suitable types of output device. For instance, using a pen computing application, a user can handwrite annotations, such as, "this is interesting," "read this again, "ludicrous," or other comments or remarks referencing a displayed book or document on a touchscreen. The handwritten annotations can also include graphical representations such as check marks, smiley faces, angry faces, etc. The pen computing applications can also allow the user to share his/her handwritten annotations to other users as still images, animations, videos, or other suitable types of media.

The sharing of annotations as digital ink can be a great tool for collaboration in a team environment. However, such sharing typically requires utilization of specialized pen computing applications, such as Windows Ink® provided by Microsoft Corporation of Redmond, Wash., and not available in web browsers. For example, when a user is reading a webpage in a web browser, the user may provide a handwritten annotation as ink on a tablet. In order to share the handwritten annotation, the user may save the ink as an image and then share the saved image with other users as, for example, an attachment in an email. Such a sharing technique can be cumbersome and does not facilitate real-time collaboration with other users in a team. As such, collaborative experiences of the users can be limited while working in a team environment on the web.

Several embodiments of the disclosed technology can address at least some of the foregoing difficulties by implementing an application (e.g., as an extension to a web browser and/or an integral part of a web browser) that is configured to facilitate web-based collaborative inking by users. Such web-based collaboration can be across different types of web browsers and/or computing platforms. Such web-based collaboration can also be real-time or at different time points. For example, users can collaborate at the same time to ink on a single webpage during an interactive session. In another example, a user can share ink from a previous collaboration session with other users and allow the other user to continue inking and/or editing the shared ink at a later date/time. Such web-based collaboration can further allow the shared ink to remain "wet," i.e., being editable by the sharing and/or shared user(s) over a period of time preset or user selectable.

In certain embodiments, the application can be configured to inject one or more rendering contexts (e.g., as individual transparent overlays or an ink rendering overlays) on a webpage displayed in a web browser on a touchscreen of a first computer upon receiving a user input from a first user to active web-based collaborative inking. For example, in one implementation, the application can be configured to inject a Scalable Vector Graphics (SVG) rendering context into the webpage by inserting suitable codes of Extensible Markup Language (XML) or other suitable types of markup language into a Document Object Model (DOM) of the webpage. In other example implementations, the application can also be configured to inject a canvas rendering context according to the Hypertext Markup Language (HTML) 5 standard, an InkML overlay, an Ink Serialized Format (ISF) overlay, or an overlay according to other suitable formats. In further implementations, multiple rendering contexts may be used. For example, ink may be anchored to a content item on a webpage, and an ink rendering overlay may be injected at a location and/or z-depth(s) of the anchored content item. Thus, other webpage content (e.g., tooltips, flyout menus, modal dialogs, etc.) on the same webpage can be correctly rendered atop/underneath the injected ink rendering overlay.

The application can then be configured to detect pointer input by the user as inking via the touchscreen or other suitable input devices of the computer. In response to detecting the pointer input, the application can be configured to serialize ink objects corresponding to the detected pointer input. In context of data manipulation, serialization is a process of translating data structures or object states into a format that can be stored (e.g., in a file or memory buffer) or transmitted (e.g., via a computer network), and then reconstructed later (e.g., in a different computer environment). As such, by serializing the detected pointer input from the user, the application can generate ink data that can be stored, transmitted, and reconstructed to represent the detected pointer input on the touchscreen. In one example implementation, the detected pointer input can be converted into one or more <path> objects according to the SVG image format. In other implementations, the detected pointer input can also be converted into one or more canvas objects, InkML objects, ISF objects, or other suitable types of objects.

Upon receiving another user input to initiate a web-based collaborative session, in certain embodiments, the application can be configured to push or otherwise transmit the serialized ink objects to a remote server along with a session ID, session policies, access credentials, and/or other suitable information. In accordance with embodiments of the disclosed technology, the remote server can be configured to store the received serialized ink objects from the application in a session buffer corresponding to the session ID and enforce any session policies for accessing and/or updating the received serialized ink objects, as described in more detail below.

On a second computer, upon receiving a user input from a second user to join the collaboration session initiated by the first user, another copy of the application on the second computer can be configured to inject a rendering context on the same webpage displayed in a web browser on the second computer, as described above with reference to injecting the rendering context on the first computer. The application can then be configured to transmit a request to the remote server to join the collaboration session along with user identifications, credentials, or other suitable information. Upon authentication of the second user, the remote server can be configured to provide the serialized ink objects to the second computer via a computer network. Upon receiving the serialized ink objects from the remote server, the application at the second computer can be configured to de-serialize the ink objects and render the de-serialized ink objects in the injected rendering context on the webpage at the second computer. For instance, in one example implementation, the <path> objects can be de-serialized sequentially to generate an animation of the received pointer input from the first user at the first computer. In certain embodiments, the generated animation can be a generally accurate representation of the received pointer input on the first computer by including data such as stroke type, stroke width, stroke velocity, and/or other suitable parameters. In other embodiments, the generated animation can be a simplified representation of the received pointer input on the first computer by representing all strokes with the same color, stroke width, or other suitable parameters.

In certain embodiments, the second user can be allowed to participate on the web-based collaboration session by providing additional ink and/or modifying existing ink. For example, the second user can provide additional pointer input on the second computer to edit, erase, add, or otherwise modify the ink objects from the first user on the second computer. In response, the application at the second computer can be configured to serialize the received pointer input into additional and/or updated ink objects and transmit such ink objects to the remote server. The remote server can then add and/or update the ink objects stored on the remote server accordingly. In certain embodiments, ink objects by different users can be individually tracked and redrawn/edited by other users. In other embodiments, the ink objects by different users can be merged into one set of ink objects. In further embodiments, the remote server can also utilize suitable applications and/or computing services to translate, reduce, and/or reconfigure the ink objects to a different object format. In yet further embodiments, the remote server can also utilize suitable applications and/or computing services to perform Optical Character Recognition (OCR), language translation, and/or other suitable operations.

In other embodiments, the second user can be allowed to perform some of the foregoing actions based on session policies received from the first user (or other suitable entities such as an session administrator) at the remote server. For example, the session policy can limit the second user's access to the ink objects to viewing only. As such, the remote server can provide the serialized ink objects to be rendered by the application at the second computer to the second user. However, any additional serialized ink objects received from the second user via the second computer would be ignored. In another example, the session policy can limit the second user's access to the ink objects to adding only but not modifying any ink objects created by the first user. As such, the remote server can add additional ink objects from the second user to the session buffer but ignore any ink objects that represent modifications to original ink objects from the first user.

Several embodiments of the disclosed technology can thus enable web-based collaborative inking by multiple users across various types of web browsers and/or computing platforms. Such web-based collaboration can also be real-time or at different time points. For example, users can collaborate at the same time to ink on the same webpage, or a user can continue inking and/or editing shared ink from a previous session at a later date/time. Such web-based collaboration can further allow the shared ink to remain "wet," i.e., being editable by the sharing and/or shared user(s) over a period of time. By allowing web-based collaborative inking via web browsers, computing loads at the various computers of the users can be reduced by not running specialized applications while improving collaboration experiences of the users.

Even though the disclosed technology is described above in the context of facilitation by the remote server, in additional implementations, the remote server may be omitted while the first and second computers can cooperate to facilitate the web-based collaborative inking in a peer-to-peer fashion. For example, both the first and second computers can be individually configured as a server with a corresponding session buffer for storing serialized ink objects and provide the serialized ink objects from the session buffer to the other computer in a collaboration session. In another example, one of the first or second computer can be configured as a server while the other is configured as a client. In further implementations, the foregoing collaborative inking technique can be facilitated by one or more database servers, authentication servers, network gateways, and/or other suitable computing devices.

DETAILED DESCRIPTION

Certain embodiments of computing systems, devices, components, modules, routines, and processes for implementing web-based collaborative inking are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1A-5.

As used herein, the term "ink" or "digital ink" refers to digital image, animation, or other suitable types of data representing one or more strokes received at an input component (e.g., a touchscreen) of a computing device by a user utilizing a stylus, a pen, a user's finger, a mouse, a touchpad, or other suitable pointer input device related to pen computing. A stroke or a combination of strokes can form one or more "ink objects" with corresponding shapes, lengths, repeating patterns, vectors, or other suitable characteristics. Ink objects can be encoded according to various formats. In one example, ink objects can include <path> objects according to SVG. In other examples, the ink objects can include canvas, InkML, ISF, or other suitable types of objects.

Also used herein, "serialization" generally refers to a process of translating data structures or object states into a format of bits that can be stored (e.g., in a file or memory buffer) or transmitted (e.g., via a computer network), and then reconstructed in real-time, near real-time, or at a later time (e.g., in the same or a different computer environment). When resulting series of bits is reread or "de-serialized," according to a serialization format, the series of bits can be used to recreate a generally semantically identical clone of an original object, such as an image or animation of an original pen stroke. As such, by serializing a detected pointer input, the application can generate data representing ink objects that can be stored, transmitted, and reconstructed at a destination computer, to represent the detected pointer input received at a source computer, and thus achieving web-based "collaborative inking."

The sharing of digital ink can be a great tool for collaboration in a team environment. However, such sharing typically requires utilization of specialized pen computing applications, such as Windows Ink® provided by Microsoft Corporation of Redmond, Wash., and not available in web browsers. For example, when a user is reading a webpage in a web browser, the user may provide a handwritten annotation as ink on a tablet. In order to share the handwritten annotation, the user may save the ink as an image and then share the saved image with other users as, for example, an attachment in an email. Such a sharing technique can be cumbersome and does not facilitate real-time collaboration among users in a team. As such, collaborative experiences of the users can be limited while working in a team environment on the web.

Several embodiments of the disclosed technology can address at least some of the foregoing difficulties by implementing an application (e.g., as an extension to and/or an integral part of a web browser) that is configured to facilitate web-based collaborative inking by users. Such web-based collaboration can be across different types of web browsers and/or computing platforms. Such web-based collaboration can also be real-time or at different time points. For example, users can collaborate at the same time to ink on a single webpage during a collaboration session. In another example, a user can share ink from a previous collaboration session with other users and allow the other user to continue inking and/or editing the shared ink at a later date/time. Such web-based collaboration can further allow the shared ink to remain "wet," i.e., being editable by the sharing and/or shared user(s) over a period of time, as described in more detail below with reference to FIGS. 1A-5.

Figure 1A:
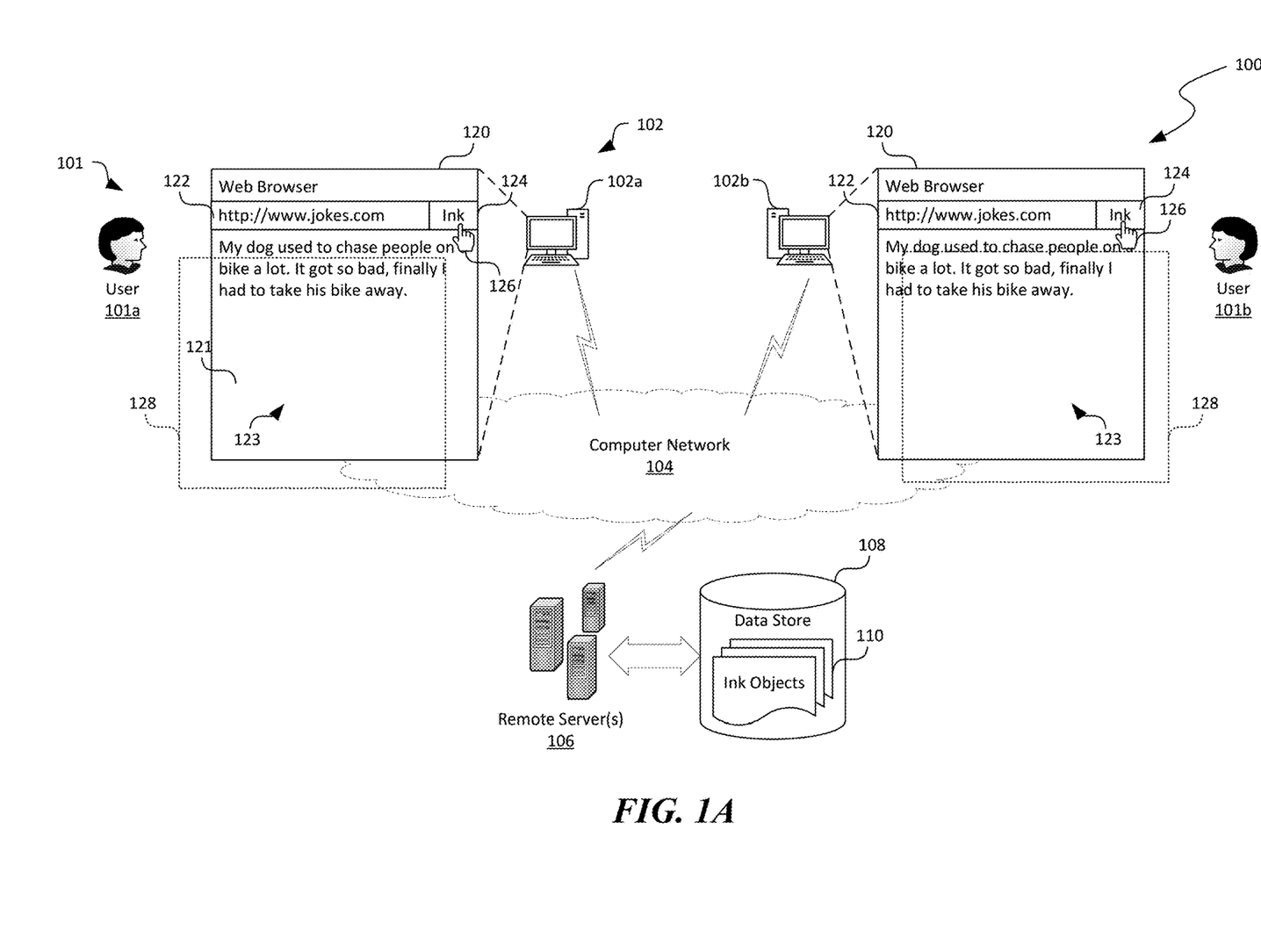
FIGS. 1A-1C are schematic diagrams of a computing system implementing web-based collaborative inking during certain stages of operation in accordance with embodiments of the present technology.
Figure 1B:
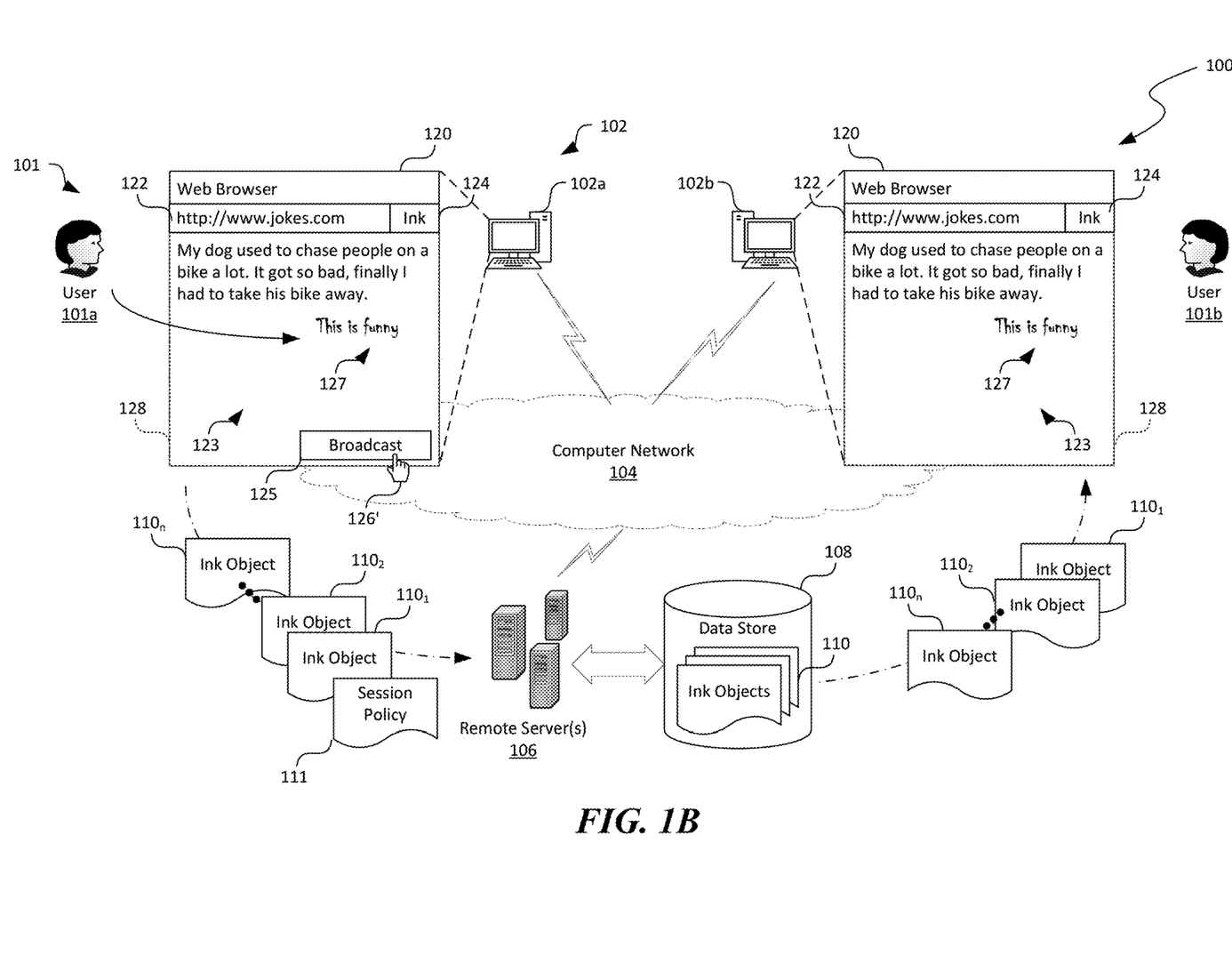
Figure 1C:
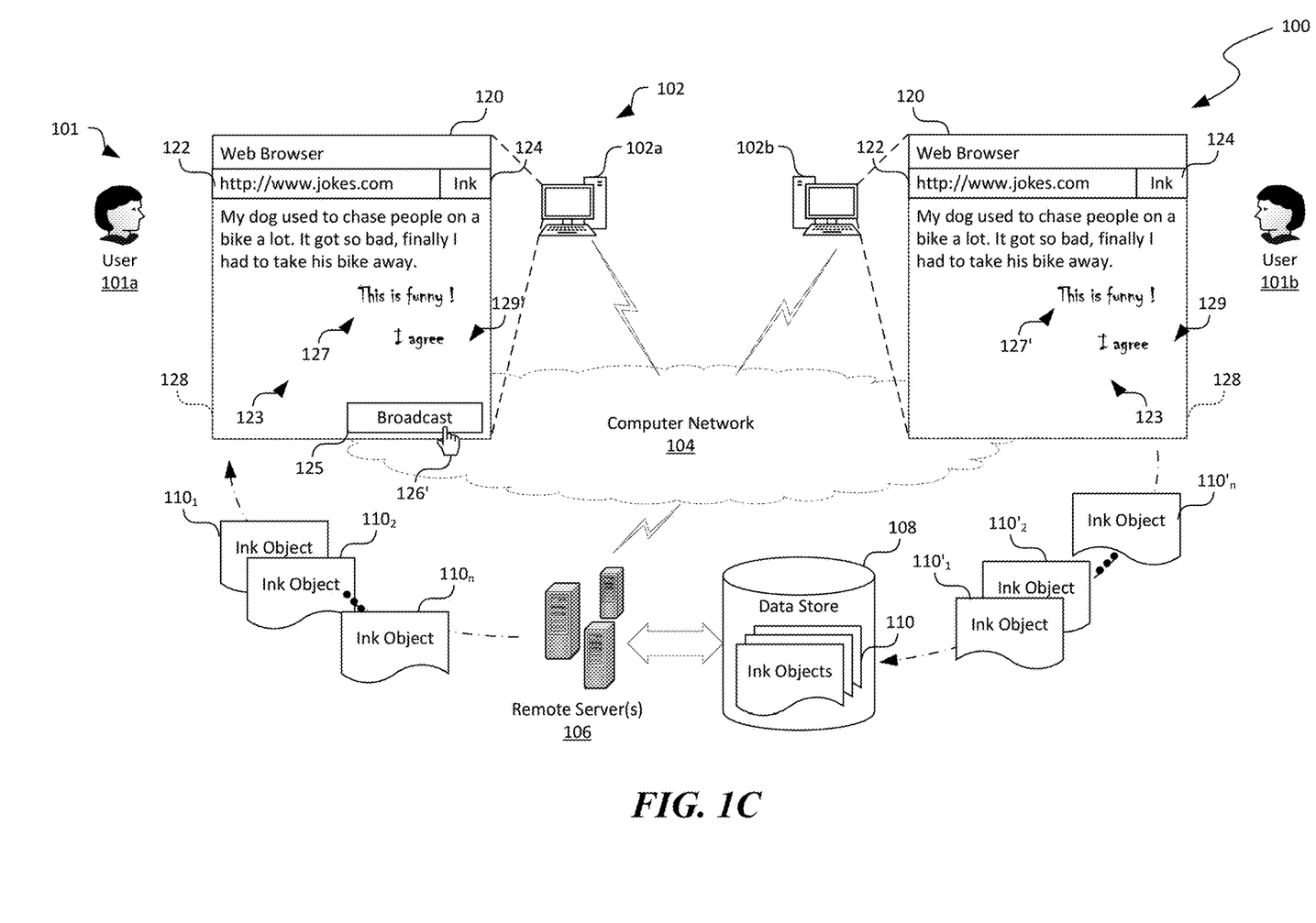

FIGS. 1A-1C are schematic diagrams of a computing system 100 implementing web-based collaborative inking during certain stages of operation in accordance with embodiments of the present technology. As shown in FIG. 1A, the computing system 100 can include a computer network 104 interconnecting client devices 102 (shown in FIG. 1A as first and second client devices 102a and 102b) and one or more remote servers (referred to herein as a remote server 106 for brevity) interconnected to a data store 108. The computer network 104 can include an enterprise intranet, a social network, the Internet, or other suitable types of network. Even though embodiments of the disclosed technology are described below in the context of an enterprise intranet, in other embodiments, the disclosed technology can also be implemented in other suitable types of computing systems with additional and/or different components.

The client devices 102 can individually include a computing device that facilitates collaborative inking via the computer network 104 by users 101 (identified as first and second users 101a and 101b). For example, in the illustrative embodiment, the client devices 102 individually include a desktop computer. In other embodiments, the client devices 102 can also individually include a laptop, a tablet, a smartphone, or other suitable types of computing device. Even though two users 101 are shown in FIG. 1A for illustration purposes, in other embodiments, the computing system 100 can facilitate any suitable number of members 101 during a collaborative inking session via the computer network 104.

As shown in FIG. 1A, the client devices 102 can individually execute suitable instructions to provide a web browser 120 (or other suitable applications configured to render webpages). In the illustrated embodiment, the web browser 120 can include a user interface with an address bar 122 containing a web address (e.g., "http://www.jokes.com") and a body section 121 containing content of a webpage 123 corresponding to the web address in the address bar 122. For example, the webpage 123 can include a sentence "My dog used to chase people on a bike a lot. It got so bad, finally I had to take his bike away" as text in the webpage 123. In other examples, the body section 121 can also contain images, videos, and/or other suitable types of content.

The web browser 120 can be configured to facilitate collaborative inking by, for instance, including, installing, or otherwise having access to an inking application 130 (shown in FIG. 3) for facilitating collaborative inking. The inking application 130 can be an extension to the web browser 120, integrated into the web browser 120, a standalone application, or other suitable types of application. The inking application 130 can be configured to provide a user interface element for activating collaborative inking. For example, as shown in FIG. 1A, the web browser 120 can include an "Ink" button 124. Upon actuating by the first user 101a, the web browser 120 can insert a rendering context 128 (shown with dashed lines for clarity) on top of the webpage 123. The rendering context 128 can include an overlay that is configured to render and surface pointer input received from the users 101 on the webpage 123. In one implementation, inserting the rendering context 128 can include inserting an SVG section representing a transparent overlay into the DOM of the webpage 123. An example code for such an SVG section is as follows:

<svg xmlns="http://www.w3.org/2000/svg" version="1.1">
...
</svg>

In other implementations, codes of canvas, InkML, ISF, or other suitable types of image format can be inserted in addition to or in lieu of the SVG section. In other examples, the collaborative inking can be activated via menu item(s) or another suitable user interface elements or can be activated automatically when the webpage 123 is loaded into the web browser 120.

The first user 101a can then provide pointer input to the webpage 123 via, for example, a touchscreen of the first client device 102a. In response, the client device 102 can be configured to detect such pointer input, convert the detected pointer input as one or more ink objects 110 (shown in FIG. 1B), and render the ink objects 110 on the inserted rendering context 128. For example, as shown in FIG. 1B, the first user 101a can handwrite a comment 127 on the webpage 123, i.e., "This is funny" in reference to the text in the webpage 123. In response, the inking application 130 can convert the handwriting by the first user 101a as one or more <path> objects and inserting the <path> objects into the SVG section in the DOM of the webpage 123 on the first client device 102a. An example <path> object is shown below:

<path d="M 100 350 q 150-300 300 0" stroke="blue" stroke-width="5" fill="none"/>

The inserted <path> objects can then be rendered on the rendering context 128 to overlay over the webpage 123 as if the comment 127 is on the webpage 123. In other examples, the pointer input from the first user 101a can also be captured with animation, stroke, or other suitable types of objects.

The first user 101a can also decide to share his/her comment 127 with the second user 101b or additional users 101 (not shown). In the illustrated embodiment, the inking application 130 can be configured to provide another user interface element (e.g., a "Broadcast" button 125) on the webpage 123. Upon actuation by the first user 101a, the inking application 130 can serialize the one or more ink objects 110 (shown as ink objects $110_1$, $110_2$, . . . , $110_n$) and transmit the serialized ink objects 110 to the remote server 106.

In certain embodiments, the remote server 106 can be configured to apply a default session policy to a collaboration session between the first and second users 101a and 101b. In other embodiments, the first user 101a can also configure and transmit an optional set of session policy 111 to the remote server 106. The session policy 111 can include data to specify access levels to the ink objects 110. For example, the session policy 111 can specify that the second user 101b can only have read, can read and add to, or can read, add to, modify the shared ink objects 110.

In response to receiving the ink objects 110 and the optional session policy 111 from the first user 101a, the remote server 106 can be configured to store the ink objects 110 in the data store with a corresponding session identification. The remote server 106 can also be configured to facilitate authentication for access the collaborative inking session by the second user 101b and provide the received ink objects 110 to the second client device 102a upon successful authentication according to the default session policy or optional session policy 111 from the first user 101a.

As shown in FIG. 1B, to participate in the collaborative inking session, the second user 101b can also actuate the "Ink" button 124. In response, a rendering context 128 can be inserted onto the webpage 123 in the web browser 120 on the second client device 102b. Upon receiving the ink objects 110 from the remote server 106, the inking extension at the second client device 102b can de-serialize the ink objects 110 and render the de-serialized ink objects 110 as one or more images or animation in the inserted rendering context 128 at the second client device 102b. The foregoing detecting, serializing, deserializing, and surfacing by the first and second client devices 102a and 102b can be periodic (e.g., once every 20 milliseconds), upon event (e.g., upon detecting a new pointer input), or according to other suitable basis. As such, in certain embodiments, the comment 127' from the first user 101a can be surfaced to the second user 101b in real-time or near real-time as the first user 101a is writing his/her comments on the first client device 102a. In other embodiments, the ink objects 110 can also stay "wet" to allow the first and/or second user 101a and 101b to view, add to, or modify at a later date/time.

FIG. 1C illustrates embodiments in which the session policy 111 allows the second user 101b to add to and modify the comment 127' from the first user 101a. As shown in FIG. 1C, the second user 101b can handwrite additional comment 129 on the webpage 123 at the second client device 102b. In response, the inking application 130 at the second client device 102b can be configured to detect such pointer input and convert/serialize the pointer input into one or more additional ink objects 110' (shown as ink objects $110'_1$, $110'_2$, . . . , $110'_n$) and transmit the serialized ink objects 110' to the remote server 106. The remote server 106 can then provide the additional ink objects 110' to the first client device 102a via the computer network 104. Upon receiving the additional ink objects 110', the inking application 130 at the first client device 101a can be configured to de-serialize the additional ink objects 110' and render the de-serialized additional ink objects 110' as one or more images or animation on the rendering context 128. As such, the additional comment 129 from the second user 101b can be surfaced to the first user 101a as the second user 101b is writing the comment 129.

Also shown in FIG. 1C, the second user 101 can also modify the comment 127 by the first user 101a on the second client device 101b. For example, the second user 101b can add an exclamation mark "!" to the end of the comment 127 by the first user 101a. In response, the inking application 130 at the second client device 102b can modify, for example, the one or more ink objects 110 corresponding to the comment 127 and transmit the modified ink objects 110 to the remote server 106. The remote server 106 can then determine whether such modification is allowed per the session policy 111 (FIG. 1B). Upon determining that such a modification is allowed for the second user 101b, the remote server 106 can modify (e.g., overwrite) a copy of the stored ink object 110 original received from the first user 101a based on the modified ink objects 110 received from the second user 101b. The modified ink objects 110 can then be provided to the first device 102a and surfaced as described above. As such, the modification to the comment 127 can be surfaced to the first user 101a in a collaborative manner. Upon determining that such a modification is not allowed, the remote server 106 can be configured to reject and/or ignore the received ink objects 110' from the second user 101b to effect access control.

Figure 2A:
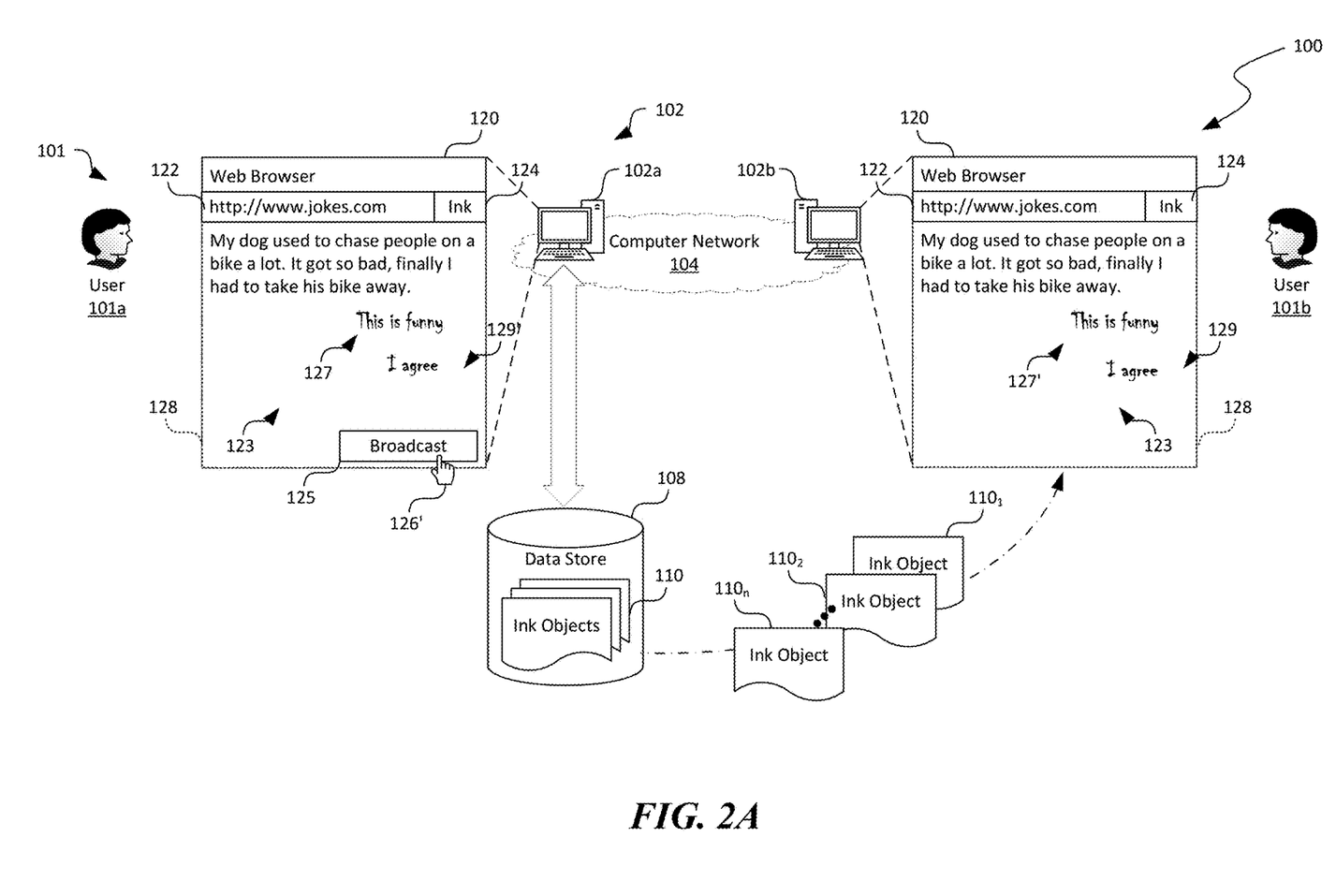
FIGS. 2A and 2B are schematic diagrams of another computing system implementing web-based collaborative inking during certain stages of operation in accordance with embodiments of the present technology.
Figure 2B:
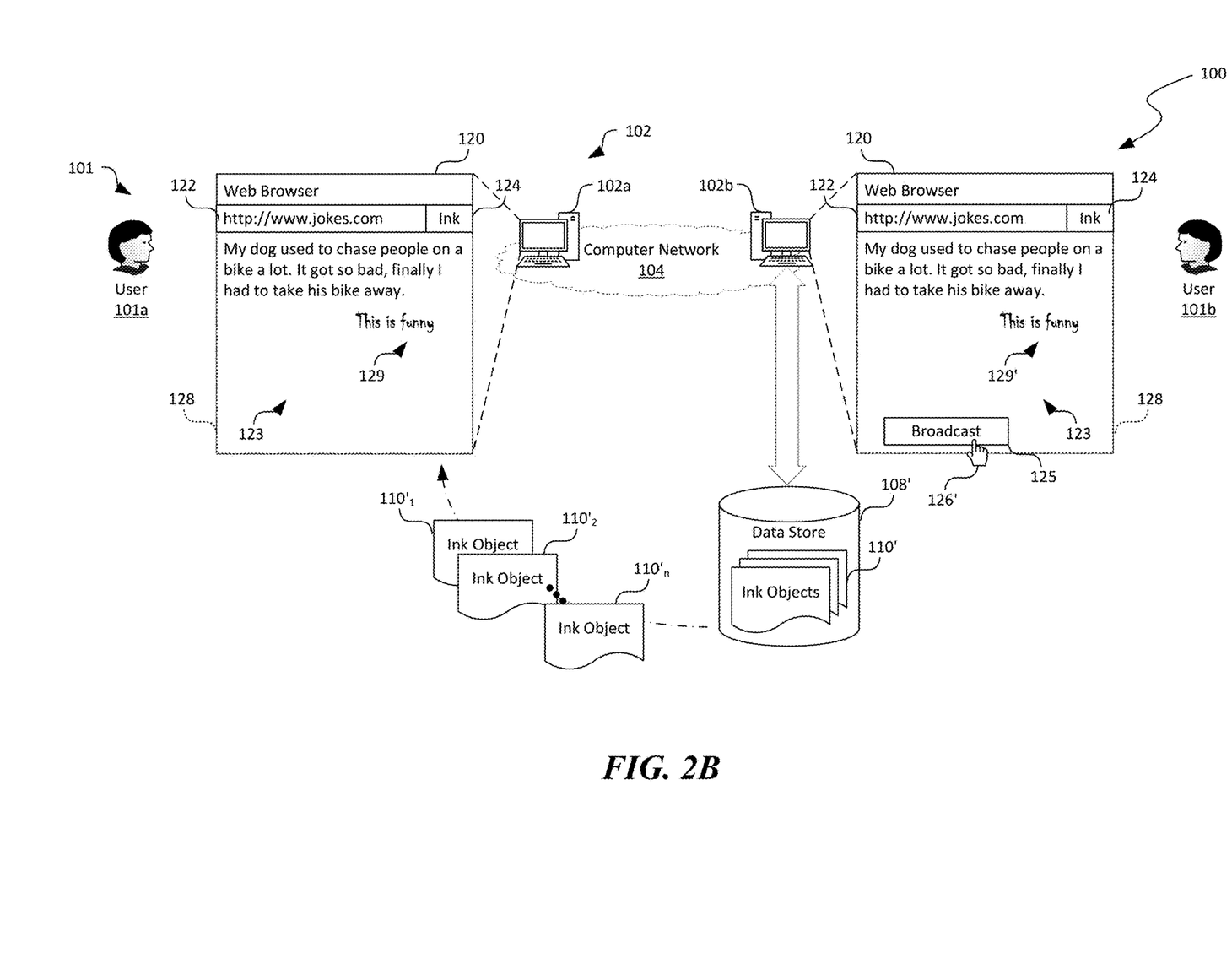

Even though FIGS. 1A-1C illustrate the computing system 100 configured to facilitate collaborative inking using the remote server 106, in certain embodiments, the computing system 100 can also facilitate such collaborative inking without the remote server 106. For example, as shown in FIG. 2A, the first and second client devices 102a and 102b can facilitate collaborative inking in a peer-to-peer manner. For example, the first and second client devices 102a and 102b can be individually configured as a server for managing and providing the ink objects 110 to other shared to client devices 100. In the illustrated embodiment in FIG. 2A, the first client device 102a can be operatively coupled to or include a data store 108 for storing the ink objects 110 from the first user 101a. The first client device 101a can then be configured to provide the stored ink objects 110 to the second client device 101b based on, for example, the session policy 111 (FIG. 1B). As shown in FIG. 2B, the second client device 102a can also be operatively coupled to or include a data store 108' for storing the ink objects 110 from the second user 101b. The second client device 101b can then be configured to provide the stored ink objects 110' to the first client device 101b based on, for example, the session policy 111.

Figure 3:
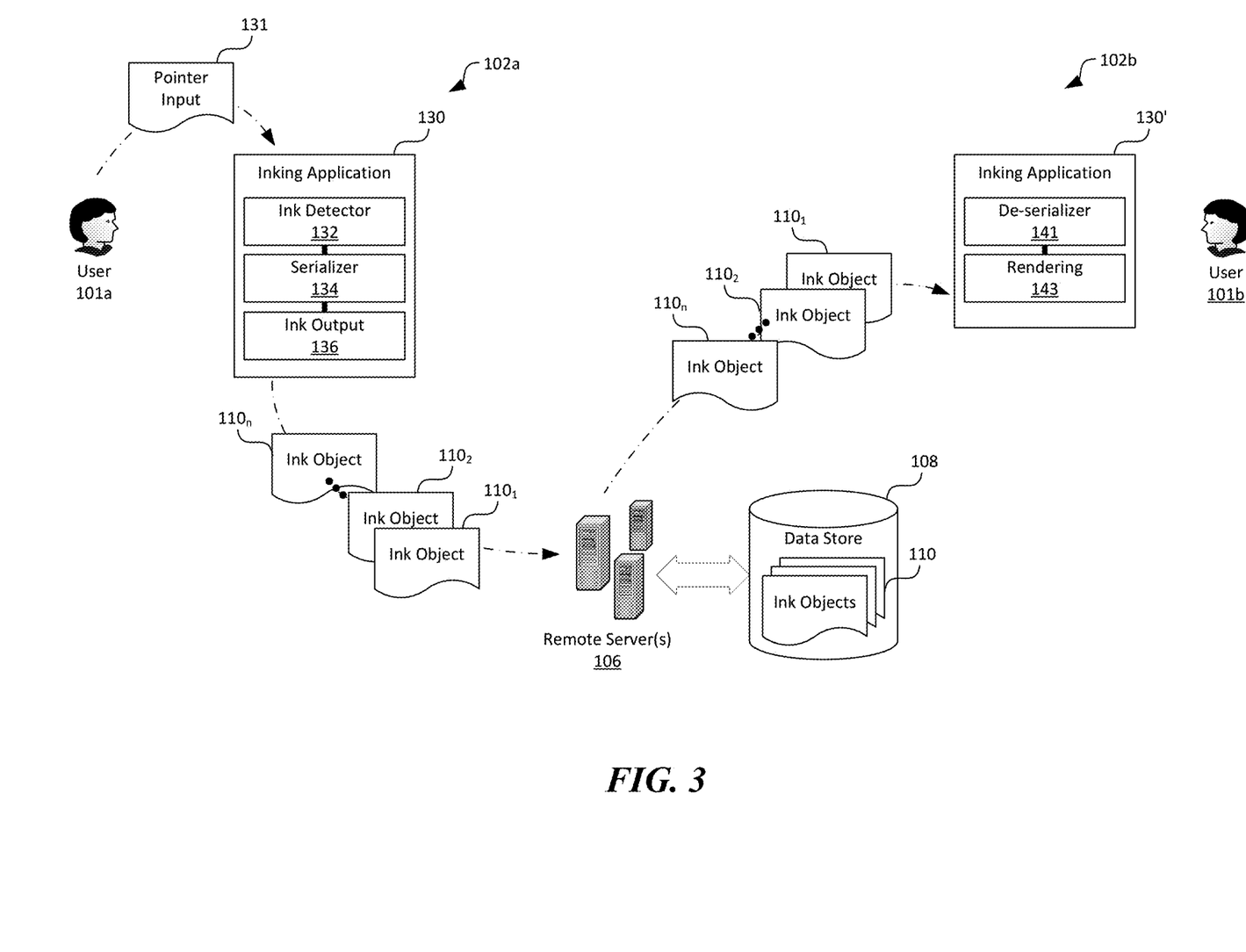
FIG. 3 is a schematic diagram illustrating example software components of the computing devices in FIGS. 1A-2B.

FIG. 3 is a schematic diagram illustrating example software components of the computing devices in FIGS. 1A-2B. In FIG. 3, the components and functions thereof are illustrated in the context of the first client device 102a sharing ink with the second client device 102b. As such, the inking application 130 at the first client device 102a can include components different than that at the second client device 102b. However, in some embodiments, such sharing can be bi-directional. As such, the inking application 130 at both the first and second client devices 102a and 102b can include all the components described below.

In FIG. 3 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media that exclude propagated signals As shown in FIG. 3, the inking application 130 can include an ink detector 132, a serializer 134, and an ink output 136 operatively coupled to one another at the first client device 102a. The ink detector 132 can be configured to detect one or more pointer input 131 from the first user 101a and convert the detected pointer input 131 into electrical or other suitable types of signals. The ink detector 132 can include a touchscreen driver and/or other suitable hardware/software components.

The ink detector 132 can then provide the detected pointer input 131 to the serializer 134 for further processing. The serializer 134 can be configured to convert the electrical signals corresponding to the detected pointer input 131 into one or more ink objects 110 that can be reconstructed by, for example, the second client device 102b. Example techniques of such conversion are described above with reference to FIGS. 1A-1C. The ink output 136 can then be configured to transmit the ink objects 110 to the remote server 106 via the computer network 104 (FIG. 1A). The foregoing detecting, serializing, and transmitting by the various components of the inking application 130 can be periodic (e.g., once every 20 milliseconds), upon event (e.g., upon detecting new pointer input 131), or according to other suitable basis.

As described above, the remote server 106 can be configured to receive the ink objects 110 from the first client device 102a, store the received ink objects 110, and provide the ink objects 110 to the second client device 102b as requested. As shown in FIG. 3, the inking application 130' at the second client device 102b can include a de-serializer 141 and a rendering component 143 operatively coupled to each other. The de-serializer 141 can be configured to de-serialize or reconstruct one or more images or animations based on the received ink objects 110. For example, the de-serializer 141 can be configured to combine multiple ink objects 110 (e.g., multiple <path> objects) to form a single image or animation. The rendering component 143 can be configured to render and surface the image and/or animation reconstructed from the received ink objects.

Figure 4A:
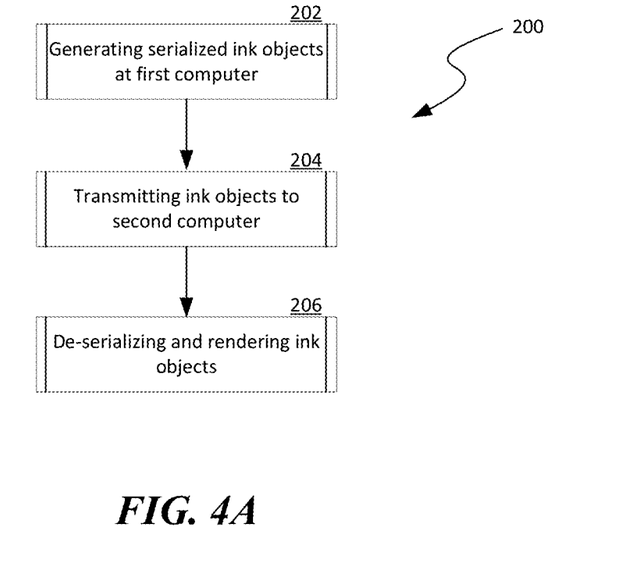
FIGS. 4A-4C are flowcharts illustrating methods of web-based collaborative inking in accordance with embodiments of the disclosed technology.
Figure 4B:
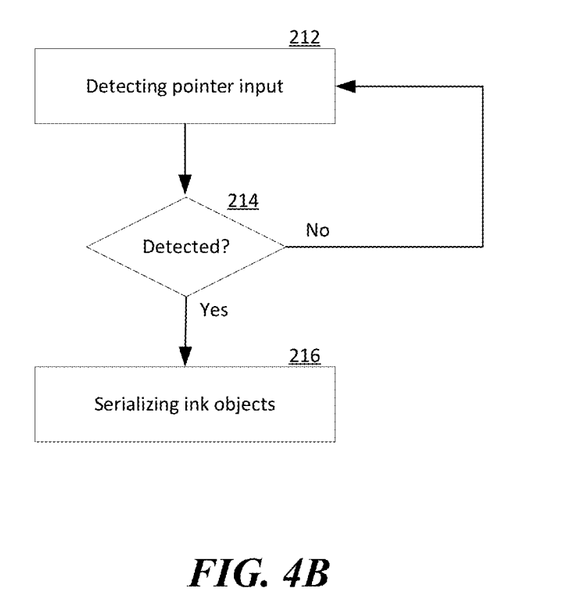

FIGS. 4A-4B are flowcharts illustrating methods of web-based collaborative inking in accordance with embodiments of the disclosed technology. Even though embodiments of the methods are described below in the context of the computing system 100 of FIGS. 1A-2B, in other embodiments, the methods can also be implemented in computing systems with additional and/or different components.

As shown in FIG. 4A, a process 200 of collaborative inking can include generating serialized ink objects at a first computer at stage 202. The ink objects can be generated according to SVG, canvas, InkML, ISF, or other suitable image and/or animation format. Example operations of generating serialized ink objects are described below with reference to FIG. 4B. The process 200 can then include transmitting ink objects to a second computer at stage 204. In certain implementations, transmitting the ink objects can be facilitated by a remote server 106, as shown in FIGS. 1A-1C. In other implementations, transmitting the ink objects can be in a peer-to-peer manner, as shown in FIGS. 2A and 2B. The process 200 can then include de-serializing the ink objects and rendering the de-serialized ink objects as one or more images and/or animations at stage 206. Example operations of de-serializing ink objects are described below with reference to FIG. 4C.

As shown in FIG. 4B, example operations for generating serialized ink objects can include detecting pointer input at stage 212, via, for example, a touchscreen or other suitable input devices. The operations can then include a decision stage for determining whether a pointer input is received. In response to determining that a pointer input is received, the operations proceed to serializing the detected pointer input as one or more ink objects at stage 216. Example implementations for serializing the pointer input are described above in more detail with reference to FIGS. 1A-1C. In response to determining that a pointer input is not received, the operations revert to detecting pointer input at stage 212.

Figure 4C:
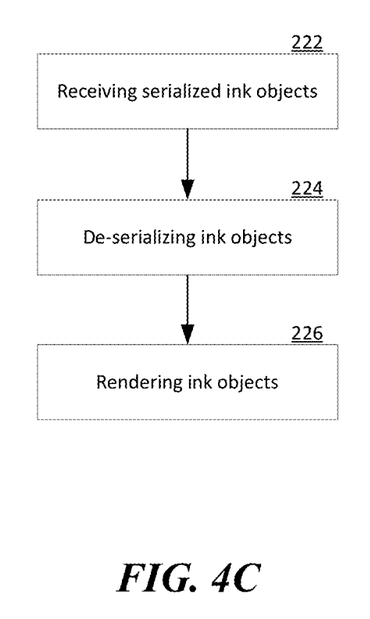

As shown in FIG. 4C, example operations for de-serializing ink objects can include receiving serialized ink objects at stage 222. The operations can then proceed to de-serializing the ink objects at stage 224. In certain embodiments, such de-serializing can be performed as the ink objects are received. In other embodiments, the de-serializing can be performed with a waiting period. For example, de-serializing can be performed on ink objects received over previous 40 milliseconds or other suitable periods. The operations can then include rendering one or more images and/or animations based on the de-serialized ink objects at stage 226.

Figure 5:
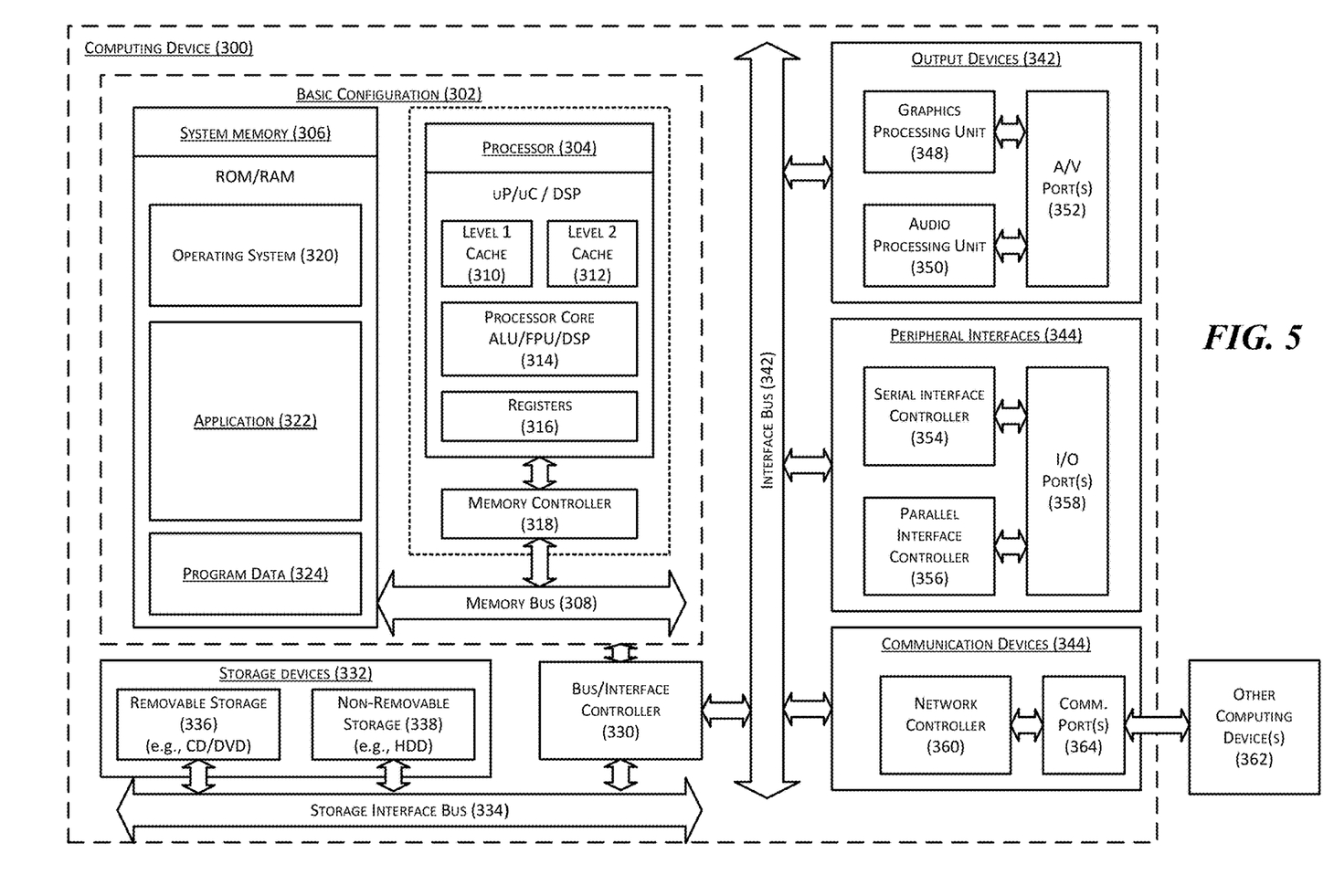
FIG. 5 is a schematic diagram illustrating example hardware components of the computing system in FIGS. 1A-2B.

FIG. 5 is a schematic diagram illustrating example hardware components of a computing device suitable for components of the computing system 100 in FIGS. 1A-2B. For example, the computing device may be suitable for the client devices 102 and the remote server 106. In a very basic configuration 202, computing device 102 can include one or more processors 204 and a system memory 206. A memory bus 208 may be used for communicating between processor 204 and system memory 206.

Depending on the desired configuration, the processor 204 may be of any type including but not limited to a microprocessor (μP), a microcontroller (μC), a digital signal processor (DSP), or any combination thereof. The processor 204 may include one more level of caching, such as a level one cache 210 and a level two cache 212, a processor core 214, and registers 216. An example processor core 214 may include an arithmetic logic unit (ALU), a floating-point unit (FPU), a digital signal processing core (DSP Core), or any combination thereof. An example memory controller 218 may also be used with processor 204, or in some implementations memory controller 218 may be an internal part of processor 204.

Depending on the desired configuration, the system memory 206 may be of any type including but not limited to volatile memory (such as RAM), non-volatile memory (such as ROM, flash memory, etc.) or any combination thereof. The system memory 206 can include an operating system 220, one or more applications 222, and program data 224. This described basic configuration 202 is illustrated in FIG. 2 by those components within the inner dashed line.

The computing device 102 may have additional features or functionality, and additional interfaces to facilitate communications between basic configuration 202 and any other devices and interfaces. For example, a bus/interface controller 230 may be used to facilitate communications between the basic configuration 202 and one or more data storage devices 232 via a storage interface bus 234. The data storage devices 232 may be removable storage devices 236, non-removable storage devices 238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 206, removable storage devices 236, and non-removable storage devices 238 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 102. Any such computer readable storage media may be a part of computing device 102. The term "computer readable storage medium" excludes propagated signals and communication media.

The computing device 102 may also include an interface bus 240 for facilitating communication from various interface devices (e.g., output devices 242, peripheral interfaces 244, and communication devices 246) to the basic configuration 202 via bus/interface controller 230. Example output devices 242 include a graphics processing unit 248 and an audio processing unit 220, which may be configured to communicate to various external devices such as a display or speakers via one or more A/V ports 222. Example peripheral interfaces 244 include a serial interface controller 224 or a parallel interface controller 226, which may be configured to communicate with external devices such as input devices (e.g., keyboard, mouse, pen, voice input device, touch input device, etc.) or other peripheral devices (e.g., printer, scanner, etc.) via one or more I/O ports 228. An example communication device 246 includes a network controller 260, which may be arranged to facilitate communications with one or more other computing devices 262 over a network communication link via one or more communication ports 264.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 102 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 102 may also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for web-based collaborative inking between a first computer and a second computer via a remote server computer interconnected by a computer network, the method comprising:
  upon detecting a pointer input, from a first user, to a webpage in a first web browser at the first computer from a first user utilizing a stylus, a pen, a mouse, a touchpad, or a finger,
    serializing the detected pointer input at the first computer into data representing one or more ink objects individually representing at least a portion of the detected pointer input and/or rendering parameters at the first computer;

transmitting the data representing the serialized ink objects to the remote server computer along with a session ID and a session policy related to accessing and/or updating of the transmitted data representing the serialized ink objects, the remote server computer being configured to forward the data representing the serialized ink objects to the second computer via the computer network according to the session policy; and upon receiving the transmitted data, at the second computer,
de-serializing the received serialized ink objects;
inserting programming code of the de-serialized ink objects into a document object model (DOM) of the webpage in a second web browser on the second computer;
reconstructing the image corresponding to the detected pointer input at the first computer with the de-serialized ink objects inserted into the DOM of the webpage on the second computer; and
surfacing, to a second user, the detected pointer input from the first user as one or more ink objects of the webpage on a second web browser surfacing the same webpage on the second computer, thereby enabling a web-based collaboration session between the first and second users.

2. The method of claim 1 wherein:
the second computer includes a rendering context on the same webpage in the second web browser; and
surfacing the image includes surfacing the image corresponding to the detected pointer input on the first computer via the rendering context.

3. The method of claim 1 wherein:
serializing the detected pointer input includes generating the one or more ink objects according to a vector image format; and
reconstructing the image includes reconstructing the image as an animation.

4. A method for web-based collaborative inking between a first computer and a second computer via a remote server computer interconnected by a computer network, the method comprising:
upon receiving a user input, at the first computer, to activate collaborative inking in a web browser surfacing a webpage,
detecting a pointer input, from the user, to the webpage in the web browser at the first computer; and
in response to detecting the pointer input to the first computer,
serializing the detected pointer input at the webpage into data representing one or more ink objects individually representing at least a portion of the detected pointer input and/or rendering parameters;
inserting programming codes of the one or more ink objects into a document object model (DOM) of the webpage; and
transmitting the data representing the serialized one or more ink objects to the remote server computer along with a session ID and a session policy related to accessing and/or updating of the transmitted data representing the serialized ink objects, the remote server computer being configured to forward the data representing the serialized ink objects to the second computer according to the session policy, wherein the second computer is configured to de-serialize the one or more ink objects to reconstruct and surface, on the second computer, the detected pointer input on the first computer by inserting programming codes of the de-serialized one or more ink objects into a DOM of the same webpage on the second computer.

5. The method of claim 4 wherein the second computer is configured to surface the image corresponding to the detected pointer input on the first computer as an animation of multiple images.

6. The method of claim 4, further comprising:
upon receiving the user input to activate collaborative inking in the web browser at the first computer,
inserting a rendering context onto the surfaced webpage in the web browser at the first computer; and
in response to detecting the pointer input to the first computer, rendering, via the inserted rendering context on the webpage, the one or more ink objects individually representing at least a portion of the image corresponding to the detected pointer input.

7. The method of claim 4 wherein:
the second computer includes another rendering context inserted onto a copy of the same webpage in another web browser; and
the second computer is configured to surface the image corresponding to the detected pointer input on the first computer via the another rendering context.

8. The method of claim 4 wherein:
the remote server computer is further configured to:
store the received serialized ink objects in a storage device based on the session ID; and
upon request, transmit the stored serialized ink objects to the second computer via the computer network.

9. The method of claim 4 wherein:
the remote server computer is further configured to:
store the received serialized ink objects in a storage device based on the session ID; and
upon request, transmit the stored serialized ink objects to the second computer via the computer network according to the received session policy.

10. The method of claim 4 wherein:
the session policy indicates that the second computer cannot add or modify the serialized ink objects from the first computer; and
wherein the remote server computer is further configured to:
store the received serialized ink objects in a storage device based on the session ID; and
upon request, transmit the stored serialized ink objects to the second computer via the computer network while preventing the second computer from adding to or modifying the stored ink objects in the storage device at the remote server computer.

11. The method of claim 4 wherein:
the session policy indicates that the second computer can add and modify the serialized ink objects from the first computer; and
wherein the remote server computer is further configured to:
store the received serialized ink objects from the first computer in a storage device based on the session ID;
receive additional ink objects from the second computer; and
store the received additional ink objects from the second computer in the storage device based on the session ID.

12. The method of claim 4, further comprising:
receiving, at the first computer, additional ink objects from the second computer; and
in response to receiving the additional ink objects, at the first computer, de-serializing the additional ink and objects from the second computer; and
rendering and surfacing the de-serialized additional ink objects as one or more image on the webpage at the first computer.

13. The method of claim 4 wherein transmitting the data representing the serialized ink objects to the second computer includes the data representing the serialized ink objects to the second computer from the first computer via the computer network via a peer-to-peer connection.

14. A computing device interconnected to another computing device via a remote server computer by a computer network, the computing device comprising:
a processor;
a display; and
a memory operatively coupled to the processor and the display, the memory containing instructions executable by the processor to cause the computing device to:
receive a pointer input, from a user utilizing a stylus, a pen, or a finger, to a webpage in a web browser surfaced on the display of the computing device; and
in response to receiving the pointer input,
generate data representing serialized ink objects individually corresponding to at least a portion of an image or animation of the received pointer input on the display;
insert programming codes of the serialized ink objects into a document object model (DOM) of the webpage; and
transmit, via the computer network, the generated data representing the serialized ink objects to the remote server computer along with a session ID and a session policy related to accessing and/or updating of the transmitted data representing the serialized ink objects, the remote server computer being configured to forward the data representing the serialized ink objects to the another computing device according to the session policy, wherein the serialized ink objects allow the another computer to de-serialize the ink objects to reconstruct and surface, on the another computing device, the image or animation corresponding to the detected pointer input on the computing device by inserting programming codes of the de-serialized ink objects into a DOM of the same webpage on the another computer.

15. The computing device of claim 14 wherein the memory includes additional instructions executable by the processor to cause the computing device to:
insert a rendering context onto the surfaced webpage in the web browser; and
in response to detecting the pointer input, rendering, via the inserted rendering context on the webpage, the one or more ink objects individually representing at least a portion of the image or animation corresponding to the detected pointer input.

16. The computing device of claim 14 wherein:
the another computer includes another rendering context inserted onto a copy of the same webpage in another web browser; and
the another computer is configured to surface the image or animation corresponding to the detected pointer input on the computing device via the another rendering context.

17. The computing device of claim 14 wherein:
the remote server computer is further configured to:
store the received serialized ink objects in a storage device based on the session ID; and
upon request, transmit the stored serialized ink objects to the another computing device via the computer network.

18. The computing device of claim 14 wherein:
the remote server computer is configured to:
store the received serialized ink objects in a storage device based on the session ID; and
upon request, transmit the stored serialized ink objects to the another computing device and additional computing devices via the computer network.

19. The computing device of claim 14 wherein:
the session policy allows the remote server computer to transmit the stored serialized ink objects to the another computing device via the computer network according to the received session policy.

20. The computing device of claim 14 wherein the memory includes additional instructions executable by the processor to cause the computing device to:
receive additional ink objects from the another computing device; and
in response to receiving the additional ink objects,
de-serialize the additional ink and objects from the another computing device; and
rendering and surfacing the de-serialized additional ink objects as one or more image or animation on the webpage in the web browser.

* * * * *